April 17, 1951 A. B. RUDENAUER 2,549,390

PHONOGRAPH RECORD CUTTING MECHANISM

Filed Nov. 8, 1948

INVENTOR.
ARTHUR B. RUDENAUER
BY
Morton S. Brockman

Patented Apr. 17, 1951 2,549,390

UNITED STATES PATENT OFFICE 2,549,390

PHONOGRAPH RECORD CUTTING MECHANISM

Arthur B. Rudenauer, Cleveland, Ohio

Application November 8, 1948, Serial No. 58,825

5 Claims. (Cl. 274—13)

This invention relates to phonograph recording and reproducing devices and particularly to arms articulately movable across a record disk.

The primary object of this invention is to provide a driving and guiding mechanism for such reproducing or recording arm.

Another object is to provide an inexpensive device of the type mentioned that may be easily attached to any conventional phonograph having a turntable and using disk type records.

Another object is to provide an electrically driven guide mechanism and a novel friction clutch therefor which will permit the cutting or playing of records from either inside out or vice versa with equal ease and precision.

Still another object is to provide a device of the type stated that can be easily set or placed on any spot of the recording disk.

A further object is to construct such a device so that it is adaptable for use to record or reproduce sounds on groove disks or on paper disks having magnetically responsive surfaces.

A still further object is to construct such devices so that they are adaptable for use with phonographs employing turntables which revolve at any predetermined speed.

Another object is to construct a phonograph reproducing arm which may be used with equal efficiency with small diameter records as well as those of large diameter.

These and other objects of the invention will become apparent from a reading of the following specification and claims together with the accompanying drawings wherein:

Conducive to a better understanding of this invention it may be well to point out that the phonograph as commonly manufactured today uses flat disks or records upon which sound is recorded mechanically in the form of a modulated spiral groove.

The record is made by first converting audible sound impulses into electrical impulses, amplifying these electrical impulses to the proper level and then converting them into the mechanical movement of a cutting stylus, whereby a spiral groove, governed in shape by the amplitude and frequency of the electrical impulses is inscribed upon the record. In order to do this satisfactorily the cutting stylus must be moved across the record steadily and at a constant rate.

The apparatus for accomplishing this commercially is complicated and costly. Home recording devices as made heretofore could not be installed in existing phonograph units without extensive structural alteration thereof. However, the instant invention as illustrated in the accompanying drawings can be easily installed in any existing phonograph unit without requiring any power take-off from the phonograph motor or any mechanical contact between the cutter arm and the turntable spindle.

Figure 1:
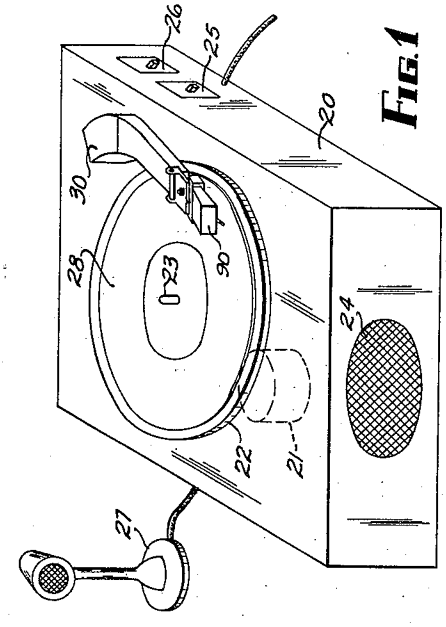
Figure 1 is a perspective view of the recording and reproducing head driving or guiding mechanism, constituting the invention, mounted on a conventional phonograph.

A phonograph arm 30 made in accordance with this invention is shown mounted on a conventional phonograph unit 20 in the Figure 1 of the drawings. Reference characters 21, 22, 23 and 24 indicate the turntable motor, the turntable, turntable spindle and speaker grill respectively.

The phonograph unit or cabinet 20 contains the usual electrical amplifier and other equipment necessary for the recording and reproduction of voice and music.

The recording and reproducing arm 30, which will be referred to hereinafter as the arm for the sake of brevity, comprises a hollow housing 31 that contains the stylus adjustment shaft 60, the electric motor 34 and the clutch assembly 40. The housing 31 is arcuate in shape as shown in the Figures 1, 5 and 6 and has a transverse wall 33 upon which the motor 34 and the gear-box 35 are mounted. The motor 34 is of the synchronous type and is connected directly to the gear train of the gear-box which terminates in a small spur gear 36.

Reference character 37 indicates a worm that has a similar spur gear 38 mounted at the end thereof that engages the spur gear 36. The outer end of the worm 37 is held by a centering bearing 39. The worm 37 in turn engages the straight cut worm gear 44 of the clutch assembly 40. The clutch assembly 40 comprises a shaft 41 that is mounted off-center in the housing 31 as shown in the Figures 2, 5, and 6.

Figure 3:
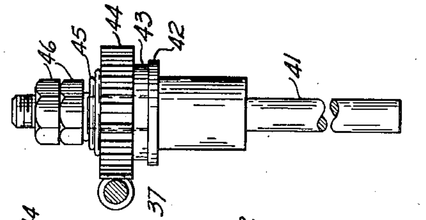
Figure 3 is a side elevation of the clutch assembly.
Figure 4:
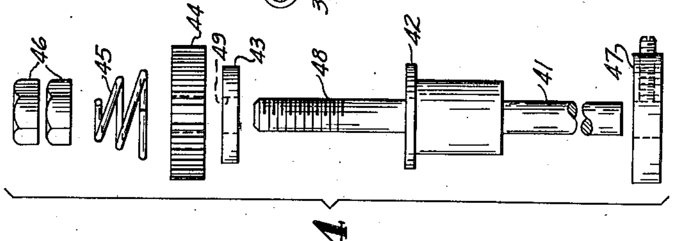
Figure 4 is an exploded view of the same.

The lower end of the clutch shaft is seated in the support 50 which is mounted on the phonograph 20 proximate the edge of the turntable 22. The support 50 is secured to the phonograph by means of screws 52 and has a central bearing hole 53 in which the clutch shaft 41 is free to turn when the arm is used for reproducing. When the arm is used for recording the shaft 41 is prevented from turning by the thumb screw 51. The shaft 41 has a threaded upper end 48 and a centrally located flange or seat 42. A friction disk 43 is seated on the flange 42. The friction disk is made of rubber or fiber and has a central hole 49 through which the clutch shaft 41 passes. A straight cut worm gear 44 is journalled on the shaft 41 above the friction disk. The gear 44 being free to rest against the friction disk 43. The worm gear 44 and the friction disk 43 are pressed against one another and the seat 42 by the clutch spring 45 which in turn is compressed by means of the lock nuts 46 which engage the threaded end 48 of the shaft 41 as shown in the Figures 2, 3 and 4. A collar 47 serves to secure the shaft 41 in the housing bearing hole 32 and also acts as a spacer for determining the height of the arm above the turntable. By substituting collars of different lengths the device can be used with turntables of any height.

Figure 5:
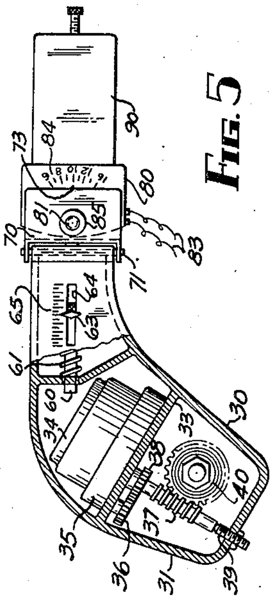
Figure 5 is a plan view of the recording and reproducing arm with a portion of the case cut away to reveal the driving mechanism.
Figure 6:
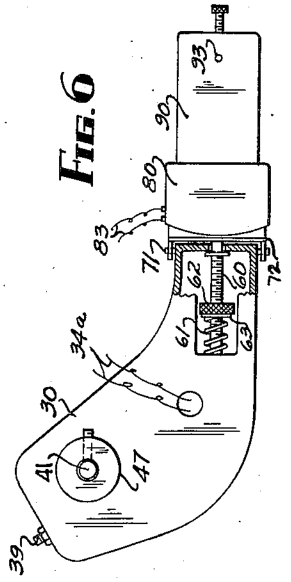
Figure 6 is a bottom view of the same.
Figure 2:
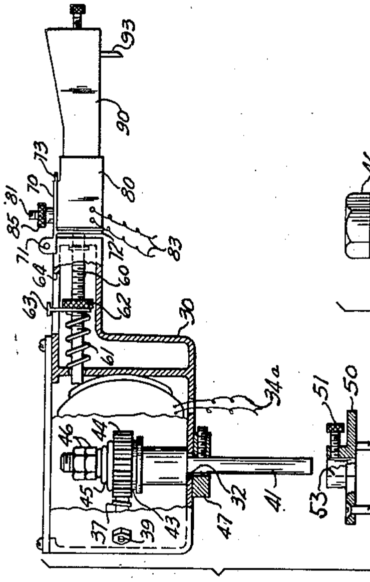
Figure 2 is a side elevation of the device with parts cut away to show the clutch and stylus pressure regulating means.

A socket support 70 is hingedly mounted on the free end of arm 30 by means of the hinge 71 as shown in the Figures 2, 5, 6. The support has a dependent pressure plate 72 integral therewith and a pointer 73.

A socket 80 is pivotally suspended from the lower side of the socket support 70 by means of the threaded stud 81 and the lock nut 85. The socket has a scale 84 on its top surface that cooperates with the pointer 73 to indicate the angular displacement of the socket 80 with reference to the arm 30 as shown in the Figure 5.

The socket has an opening for receiving and supporting the base of the particular reproducing or recording head that is to be used with the device.

Reference character 60 indicates a stylus adjustment shaft that is used to regulate the amount of pressure exerted by the stylus or needle 93 of the various heads on the record. The shaft 60 is slidably mounted in the housing as shown in the Figures 2, 5, 6, with one end pressed against the pressure plate 72 of the socket support 70 by means of the spring 61. The amount of pressure is determined by the location of the thumb nut 62 that is threadedly engaged with the shaft 60 and which can be moved to compress the spring 61. A pointer 63 is mounted on the shaft 60 with its indicating end extending through a slot 64 in the top of the housing 31. A scale 65 along the slot is suitably marked to indicate the pressure exerted.

The arm 30 can be used with an existing phonograph having a reproducer arm of the conventional type, or having a record changing arm, by locating it in an unused corner of the turntable compartment. The arcuate shape of the housing 31 and the eccentric location of the clutch shaft 41 reduces the space required to a minimum. The device can also be used alone with a phonograph having no other tone arm as it is shown for the sake of clarity in the Figure 1.

The proper position of the arm proximate the turntable is determined and a hole, slightly larger than the diameter of the clutch shaft 41, is drilled in the phonograph case. The support 50 is secured in place by the screws 52 with its bearing hole 53 aligned with the hole just drilled in the case. The clutch shaft 41 is inserted in the support bearing hole 53 until the spacing collar 47 rests on the support 50. The arm 30 is then free to pivot on the support 50. As stated hereinbefore, collars of different height can be used to adapt the arm for use with phonographs having turntables either flush with, or raised above the phonograph case. The lead wires 83 of the socket 80 are connected to a conventional microphone 28 when the arm is to be used for recording, and a cutter head 90 having a cutting needle 93 is inserted in the arm socket 80. The arm motor 34 is connected to a source of alternating current by means of the leads 34*a*. A snap switch 26 for the purpose of conveniently turning the motor on and off is mounted on the phonograph case proximate the usual turntable motor switch 25.

The thumb screw 51 is tightened against the clutch shaft 41 making it immovable in the support 50. The clutch spring is compressed by means of the lock nuts 45 until the worm gear 44 is firmly pressed against the friction disk 43. This pressure causes the worm gear to become a unit with the shaft 41 through the friction disk 43. However, the arm 30 can be moved manually about the shaft 41 against the friction between the friction disk 43 and the friction disk flange 42.

The turntable motor is then started by throwing the switch 25 to its "on" position and the turntable is caused to rotate. The arm motor 34 is started by throwing the switch 26 to its "on" position and the arm 30 is manually moved over the turntable until the stylus 93 is positioned over the starting point on the record 28 and then the stylus is placed on the record.

The arm motor 34, being of the synchronous type, such as is used in electric clocks, will revolve steadily and at a constant rate. The gears in the box 35 are arranged to cause the spur gear 36 to revolve at approximately one revolution per minute. The spur gear 36 drives the spur gear 38 and the worm 37 at the same rate. The teeth of the worm 37 and the worm gear 44 are proportioned so that the stylus will cut approximately ninety grooves to the inch which is the standard practice.

Inasmuch as the shaft 41 is locked in place by the thumb screw 51 it is impossible for the worm gear 44 to be rotated by the worm 37 for the pressure of the worm gear against the friction disk 43 is intentionally made too great for the motor 34 to overcome. However, since the housing 31 is free to pivot around the clutch shaft 41 the revolving worm 37 will travel around the worm gear 44 carrying the housing 31 with it. This will cause the stylus 93 to move across the record from the outside edge toward the center. The worm and gear drive produces a steady and vibrationless torque that moves the stylus accurately across the record. The grooves are evenly spaced and the shaving or thread is straight and continuous.

At the end of the recording the stylus is lifted from the groove and the arm moved back out of the way. This can be done without turning off the arm motor 34 if desired, because the worm gear 44 floats on the shaft 41 between the friction disk 43 and the clutch spring 45. The housing 30 therefore can be manually pivoted around the shaft 41.

By reversing the motor 34 the arm 30 can be made to travel from the inside of the record to the outside edge thus making available to the home recorder the better tone quality usually available only with the more expensive commercial recording machines.

To use the arm to reproduce the sound just recorded a reproducing head is substituted for the recording head 90 in the socket 80. The mounting thumb screw 51 is then loosened thereby leaving the clutch shaft 41 free to turn in the support hole 53. The stylus is placed in the outer groove of the record and the stylus pressure adjusted by means of the pressure adjustment nut 62. The leads from the reproducing head are then connected to the loud speaking system of the phonograph and the turntable started. The stylus follows the record groove and the arm 30 moves across the record as the shaft 41 freely pivots in the support hole 53. Thus the same arm can be used for either recording or reproducing.

The device can also be used with magnetic records of the type consisting of a paper disk having a magnetically responsive coating on the surface thereof. This type of record has become popular for home and business use because it is inexpensive, light in weight and re-useable. Since no groove is made the head has to be mechanically moved over the surface of the record when reproducing as well as when recording. These records therefore can not be used on existing phonographs, even for reproduction.

However, before the instant device can be used for the recording or reproduction of sound on magnetic disk records certain adjustments of track spacing must be made. The recording of sound magnetically requires a greater space between the sound tracks than is required with grooved records. The magnetic records have approximately thirty or thirty-five tracks per inch, instead of the ninety or one-hundred used on grooved records and therefore the arm 30 must travel at a faster rate. This can be easily accomplished by substituting a worm and worm gear of the proper ratio. Since the worm gear 44 is of the straight cut type it can be easily slipped up the shaft 41 to disengage it from the worm 37. The new worm and worm gear can then be as easily re-assembled.

The arm is operated for recording magnetically in the same manner as in recording mechanically. For reproduction with magnetic disks the arm is caused to move over the record in the same manner as when recording, with the exception that the magnetic head which now acts as a pick-up head is connected to the phonograph loud speaker system. The clutch assembly 40 permits the pick-up head to be moved manually across the record until the sound is heard. Upon release of the arm the motor 34 will automatically move the arm steadily and evenly along the sound track.

From the foregoing description it will be readily understood that the instant phonograph arm can be adapted easily and quickly to every type of sound recording and reproduction on records of all sizes, both grooved and ungrooved. Furthermore, the device is self-contained and self-operated, so that no special mechanical connection has to be made between it and the working parts of an existing phonograph.

The arm can be easily removed from the phonograph by lifting the shaft 41 out of the support 50 and as easily put back in place, without the use of any tools. The clutch assembly 40 permits the arm to be moved quickly to any position on the record without waiting for the gear mechanism to slowly move it to the required point, as must be done with other devices. The method of mounting the worm gear 44 as a floating unit on the shaft 41 permits the worm gear 44 and the worm 37 to be constantly engaged, whether the arm is being pivoted manually or by the motor 34, thereby assuring accurate meshing of the moving parts at all times.

It will now be clear that there has been provided a device which accomplishes the objectives heretofore set forth. While the invention has been disclosed in its preferred form; it is to be understood that the specific embodiment thereof as described and illustrated herein is not to be considered in a limited sense as there may be other forms or modifications of the invention which should also be construed to come within the scope of the appended claims.

I claim:

1. In combination with a phonograph record and turntable therefor, a recording and reproducing arm, comprising, a bracket mounted on the phonograph proximate to the turntable, a support member mounted on the bracket having a clutch plate including a friction surface and a driven gear mounted on the support in engagement with the said friction surface, and an arm member having a motor including a drive gear mounted on one end thereof engageable with the said driven gear and also having an operating head including a stylus on the other end thereof engageable with the aforesaid record.

2. In combination with a phonograph record and turntable therefor, a recording and reproducing arm, comprising, a bracket mounted on the phonograph proximate to the turntable, a support member mounted on the bracket having a clutch plate, a driven gear rotatably mounted on the said support including a friction surface engageable with the said clutch plate, and an arm member having a motor including a drive gear mounted on one end thereof engageable with the said driven gear and also having an operating head including a stylus on the other end thereof engageable with the aforesaid record.

3. In combination with a phonograph record and turntable therefor, a recording and reproducing arm, comprising, a bracket mounted on the phonograph proximate to the turntable, a support member mounted on the bracket having a clutch plate including a friction surface, a worm gear rotatably mounted on the support in engagement with the said friction surface, and an arm member having a motor including a worm mounted on one end thereof engaged with the said worm gear and also having an operating head including a stylus on the other end thereof engageable with the aforesaid record.

4. In combination with a phonograph record and turntable therefor, a recording arm, comprising, a support member mounted on the phonograph proximate to the turntable and having a worm gear immoveably mounted thereon, and an arm member rotatably mounted on the said support member, the said arm member having a motor including a worm, engaged with the said worm gear, mounted on one end thereof and also having an operating head, including a stylus, on the other end thereof engageable with the aforesaid record, the said arm being rotatable around the said support member and worm gear and arcuately moveable across the said record in response to rotation of the motor driven worm.

5. In combination with a phonograph record and turntable therefor, a recording arm comprising a support member having a clutch plate including a friction surface, immoveably mounted on the phonograph proximate to the turntable, a worm gear rotatably mounted on the said support in spring pressed engagement with the said friction surface and normally in immoveable engagement therewith, the said worm gear being rotatable on the said support friction surface at a predetermined abnormal torque, and an arm member rotatably mounted on the said support member, the said arm member having a motor including a worm engaged with the said worm gear mounted on one end thereof and also having an operating head including a stylus on the other end thereof engageable with the aforesaid record, the said arm being rotatable around the said support member and worm gear and arcuately moveable across the said record in response to rotation of the said motor driven worm.

ARTHUR B. RUDENAUER.

REFERENCES CITED

The following references are of record in the file of this patent:

UNITED STATES PATENTS

| Number | Name | Date |
|---|---|---|
| 1,389,429 | Gilman | Aug. 30, 1921 |
| 2,272,905 | Conrad et al. | Feb. 10, 1942 |
| 2,354,558 | Thompson | July 25, 1944 |
| 2,369,087 | Thompson | Feb. 6, 1945 |

FOREIGN PATENTS

| Number | Country | Date |
|---|---|---|
| 425,086 | France | June 1, 1911 |